Oct. 20, 1959     H. W. STRATFORD     2,909,533
METHOD AND APPARATUS FOR CHEMICAL REACTIONS
Filed April 3, 1957     2 Sheets-Sheet 1

INVENTOR.
Herbert W. Stratford
BY Thos. E. Scofield
ATTORNEY.

United States Patent Office

2,909,533
METHOD AND APPARATUS FOR CHEMICAL REACTIONS

Herbert W. Stratford, Kansas City, Kans., assignor to Stratford Engineering Corporation, Kansas City, Mo., a corporation of Delaware Application April 3, 1957, Serial No. 650,466

5 Claims. (Cl. 260—400)

This invention relates to control of chemical reactions in which gas and/or heat are liberated and refers more particularly to methods of and apparatus for manufacturing surface-active agents such as wetting, emulsifying, dispersing, penetrating and deterging agents which contain salts or organic sulphonic acids. The invention partially refers to improvements in the neutralization of an organic sulphonic acid mix which permits maintaining the temperature of the reacting materials practically constant despite the large amount of heat liberated in the reaction.

This application is an improvement over United States Patents No. 2,655,435 and 2,690,446 to Lowell A. Ledgett entitled "Chemical Reaction Tower" and "Control of Chemical Reactions," respectively.

The neutralization of organic sulphonic acids suitable for use as surface-active agents is an exothermic reaction which liberates a very substantial amount of heat. If this heat is not effectively dissipated, the temperature of the reacting mixture may rise sufficiently to cause excessive deterioration of the product, particularly if the pH is not controlled closely throughout the reaction mixture by rapid and complete mixing of the reactants. Serious operating difficulties may also be encountered in this and other exothermic reactions if temperature rise is not controlled.

According to the present method, the neutralization of organic sulphonic acids for the production of surface-active agents is carried out by introducing the reagents successively into a mechanically circulated and agitated mass of reaction product under sufficient pressure to maintain water or other volatile components in liquid phase, whereupon the mass still under pressure is discharged from the reaction step into indirect heat exchange with a recycle stream of cooled reaction product and then passed to an isolated zone of lower pressure to flash off a controlled amount of volatile components. In this way, the temperature of the reactants is lowered by indirect heat exchange with the circulating product, and further lowered by the flash off of volatiles. The composition of the final product is readily controlled and adjusted, and objectionable foaming of the fluid mass, which premature volatilization of volatile components might cause, is prevented. From the isolated separate zone of lower pressure, the flashed mixture is recycled to the reaction step to aid in temperature control thereof.

The method and apparatus of Ledgett, as set forth in the above listed two patents, possess numerous substantial shortcomings. The Ledgett apparatus employed but a single impeller and the method contemplated introducing both the reagents at the impeller, simultaneously, or the acid upstream from the impeller with the alkali introduced at the impeller. As to the apparatus, in the first place, the reagents, however introduced, do not have a chance to mix thoroughly in one pass through the single impeller, thus permitting unreacted reactants to deteriorate the reaction product stream all the way around the recycle circuit until the next pass through the impeller. In the second place, the single impeller develops insufficient differential pressure head across it to handle sufficiently high viscosity or high specific gravity materials for certain applications. As a result, the apparatus can handle only relatively low percentages (50% or lower) of solid concentration and requires a relatively large spray or flash tower.

As to method, Ledgett, in the modification of his invention wherein both of the reactants are introduced at the impeller, provides an objectionable amount of time and opportunity for side reactions of the more reactive reactant with the reaction product stream before the reaction is completed. This lowers the quality and yield of the product. The apparatus of Ledgett does not provide an opportunity for the input of the less reactant reagent, a mixing step, the input of the more reactive reagent and then a mixing step, the ideal situation which is provided by the present invention. In the modification of the Ledgett method wherein the acid is input before the impeller and the alkali at the impeller, there is not provided, even here, thorough mixing or stage mixing and control of the reactants in the stream.

Therefore, an object of the invention is to provide a method and apparatus for the production of surface-active agents wherein the reactants are completely and thoroughly mixed within the reaction product stream immediately following their input into the reaction product stream.

Another object of the invention is to provide a method and apparatus for production of surface-active agents wherein the reaction product is recycled as the carrier of the input reactants and wherein one of the reactants may not advantageously be placed in excess in the circulating reaction product stream, the inventive method and apparatus permitting insertion of one reactant in the stream with thorough and complete mixing thereof therein before insertion of the second reactant, the input of the second reactant being followed by a very thorough mechanical mixing to immediately bring the second reactant into contact with the first reactant and minimize the contact of the second reactant with the circulating reaction product stream.

Another object of the invention is to provide an apparatus for production of surface-active agents wherein the reaction product is recycled as the carrier of the input reactants, the apparatus having a plurality of impellers developing in combination sufficient differential pressure head across themselves to handle high viscosity or high specific gravity materials, thus permitting a relatively high percentage of solid concentration in the reaction product recycle stream and requiring a minimum sized spray or flash tower.

Another object of the invention is to provide a method of producing surface-active agents wherein the circulating reaction product stream is employed as the carrier of the input reactants, the method permitting the maximum protection of the reaction product stream and thus maximizing the quality of the product and yield thereof.

The chief and key object is to get close control of pH and complete neutralization of the acids. Usually it is desirable to be a little on the basic side, for example, up to 9.0 pH. With Ledgett, one may have a pH of 9.0 and still have free acid present.

Other and further objects of the invention will appear in the course of the following description thereof.

In the drawings, which form a part of the instant specification and are to be read in conjunction therewith, there is shown an embodiment of the invention and in the various views, like numerals are employed to indicate like parts.

Figure 1:
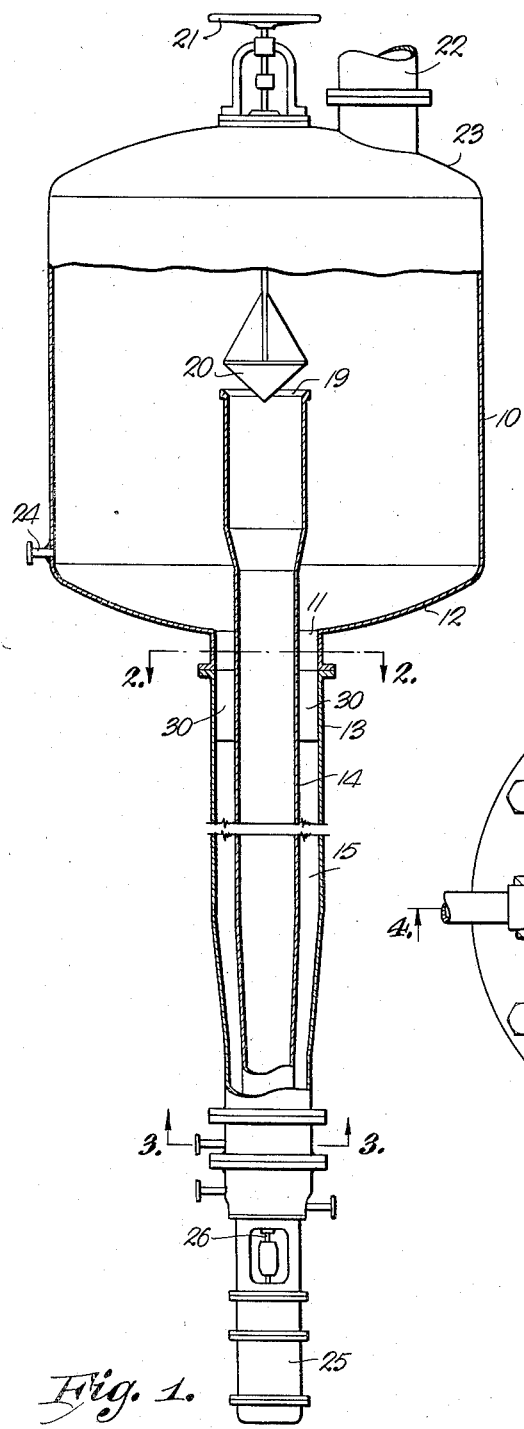
Fig. 1 is a side view with parts in section of the inventive apparatus.
Figure 2:
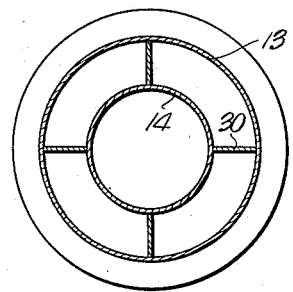
Fig. 2 is a view taken along the lines 2—2 of Fig. 1 in the direction of the arrows.
Figure 3:
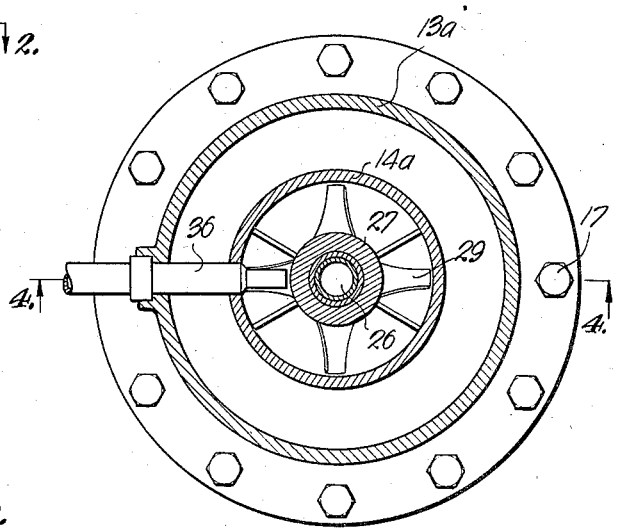
Fig. 3 is a view taken along the lines 3—3 of Fig. 1 in the direction of the arrows.
Figure 4:
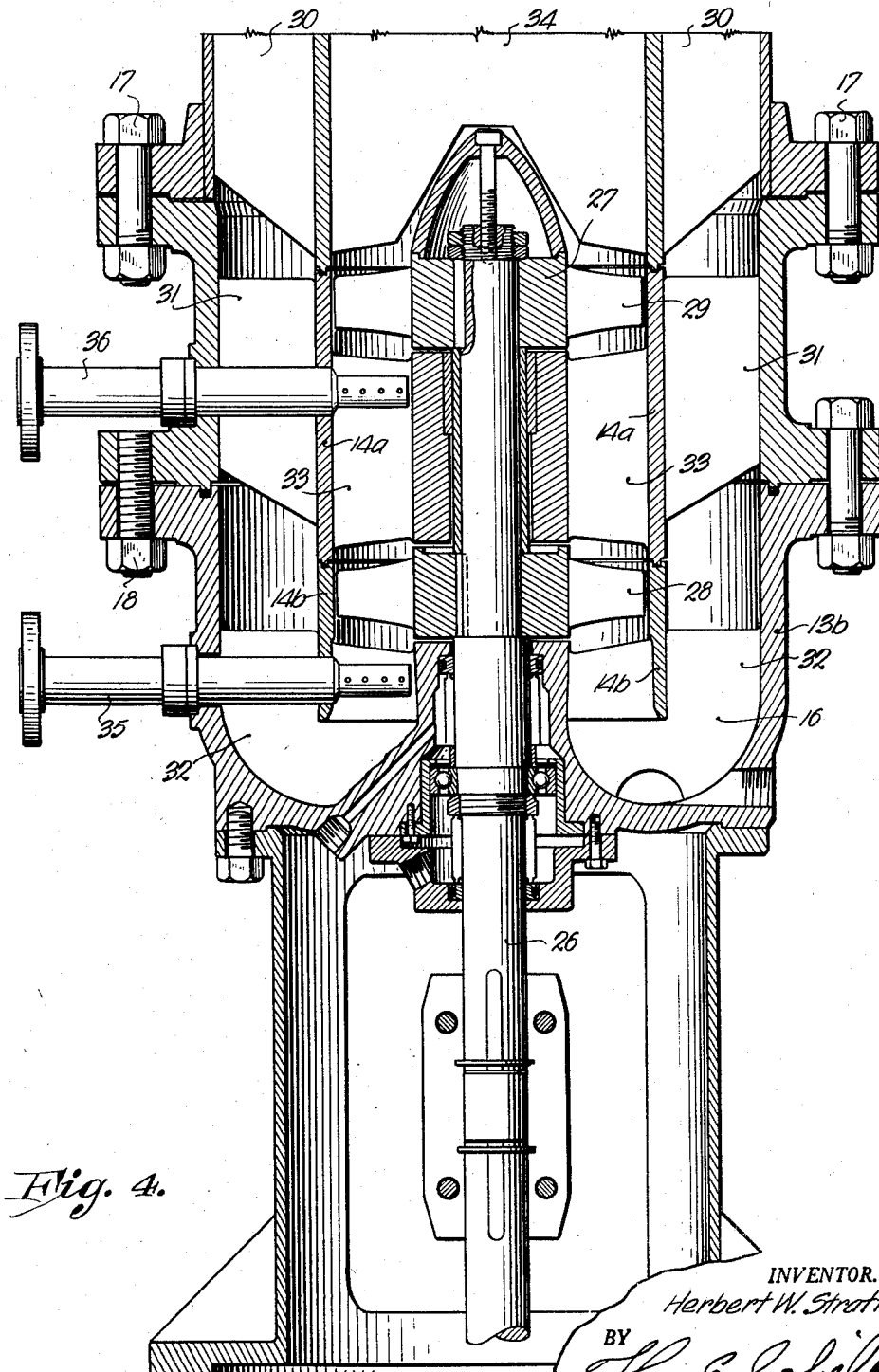
Fig. 4 is a side-sectional view of the lower part of the apparatus in Fig. 1 which is not shown in section, illustrating the relative positions of the impellers and fluid input lines.

The term "organic sulphonic acids" is meant to include those substances in which the —$SO_3H$ or —$OSO_3H$ group is attached to an organic radical and which, when neutralized, have surface-active properties and may be used as detergents, wetting, emulsifying, dispersing, penetrating agents, etc., such as, for example, sulphates and sulphonates of long-chain aliphatic hydrocarbons, higher fatty alcohols, long-chain fatty acids, polyhydric alcohol esters of fatty acids, alkyl ethers of polyhydroxy compounds, mixed aromatic and aliphatic hydrocarbons and the like.

The term "neutralizing agent" includes those substances capable of neutralizing organic sulphonic acids and may be taken from the group consisting of alkali metal and alkaline earth metal hydroxides and salts of these metals with weak acids such as carbonates and bicarbonates, aqueous ammonia, and organic bases such as the alkanolamines. It is generally preferred to employ caustic soda or soda ash as the neutralizing agent in the present invention where sodium salts are being manufactured.

The term "liquid" as used herein is intended to include within its scope true solutions, colloidal solutions and suspensions of solids in a liquid vehicle.

Referring to the drawings, at 10 is shown a cylindrical evaporator or flash cooling vessel adapted to maintain a fluid body of reaction products in a lower portion thereof. A flanged central outlet 11 provides a passage through the bottom wall 12. An outer flanged draft tube 13 is secured to outlet 11. An inner draft tube 14 is positioned within the outer draft tube 13 whereby to provide an annulus 15 therebetween. Secured to the lower flange of draft tube 13 is a casing composed of two parts 13a and 13b, upper and lower respectiively, the lower portion 13b having a toroidal cavity 16 of substantially U-shaped vertical section. The casings 13a and 13b are secured to the upper draft tube and one another by bolts 17 and 18, respectively. The inner draft tube 14 extends into the cavity 16 but terminates short of the bight thereof so that material flowing downwardly through the annular space 15, upon reaching the casing 13b, is directed upwardly through the inner draft tube 14 which is substantially longer than the outer draft tube 13 and extends into the free space of the vessel 10.

In the upper outlet 19 of the inner draft tube 14 is a conical head 20 which is adjustable in elevation with respect to rim 19 by means of an external wheel 21, thus providing an orifice of adjustable area. By adjusting the area of the orifice, the pressure on the mass in the inner draft tube 14 can be regulated and controlled as required to prevent premature vaporization or swelling within tube 14 and also to produce the required spray action to afford surface for vaporization and/or degasification when the fluid issues into the free space in the vessel.

A vapor line 22 is connected to the upper wall 23 of the cylindrical vessel and communicates with a condensing system (not shown) which serves to maintain the absolute pressure on the system at any desired level. Finished products are removed from the system by pipe 24, shown near the bottom of the cylindrical wall of the vessel 10, but locatable anywhere below the liquid level in vessel 10 or in the wall of the draft tube 13 any place above the level of introduction of either reactant.

The condensing apparatus used to maintain the absolute pressure, usually a vacuum, may be chosen from a large class, for example any of the types commonly used in evaporation and distillation arts and in the reduction of back pressure in steam power systems, such as surface condensers, ejector condensers, barometric condensers, syphon condensers and the like. The condenser may, if desired, be supplied with additional vacuum producing means for removing gas evolved in the reaction, for example carbon dioxide.

Motor 25 drives shaft 26 to which is fixed hub 27. A first lower impeller 28 is formed so as to develop a low net positive suction head whereby to develop a high suction and overcome the adverse suction situation it is in. An upper second impeller 29 is preferably formed so as to provide a maximum discharge force and mixing action whereby to support any desired column of discharged liquid thereabove. The impellers 28 and 29 are fixed to the hub 27 which is keyed to and attached to the shaft 26. Both of the impellers are positioned within the inner draft tube 14. Vanes 30 regulate the downward flow of the recycle liquid from vessel 10 as well as lower vanes 31 also positioned in the annulus between the outer draft tube 13 and the inner draft tube 14. Vanes 30 support the upper portion of the inner tube 14 relative the outer tube 13, vanes 31 the attached lower portion of the inner tube 14a and vanes 32 the lowermost separate yet attached portion 14b of the inner draft tube 14. The vanes 32 extend around the U-bend in the casing 15. The vanes 32 guide the flow into the first impeller 28 and vanes 33 regulate the flow between the two impellers while the vanes 34 above the second impeller 29 regulate the flow of the liquid above the impeller zone.

A first input draft nozzle 35 extends through the housing 15 and the portion 14b of the inner draft tube below the first impeller 28. A second fluid input line 36 extends through the casing portion 13a and the inner draft tube portion 14a between the two impellers and preferably slightly closer to the second impeller 29.

In operation, assuming a sufficient level of liquid materials in vessel 10, the reaction product is circulated down within the annulus 15 and up through the inner draft tube 14 to be discharged out of the top thereof into the zone of reduced pressure in the vessel 10. With circulation established, alkali is introduced through fluid line 35 below the first impeller 28. The introduction of an excess of alkali into the circulating reaction product exerts a minimum of effect on the circulating product itself in the manner of deterioration thereof. The circulation then carries the alkali-rich product stream into the impeller 28 which immediately highly mechanically mixes the alkali into the product stream and discharges it from the impeller. This stream then passes to zone 33 into which the input line or nozzle 36 extends and from which issues the acid component of the reaction, thus initiating the reaction leading to the desired product. Immediately, however, having received the acid, the product stream is moved into the second impeller 29 which highly mechanically mixes and disperses the reactants within the products stream and hurls it upwardly into the draft tube 14. It should be noted that, at no time is there any excess of acid in the product stream, except in localized zone 33, thus protecting the stream from deterioration thereby. Additionally, when the acid is put into the stream, the stream is already alkali rich and the acid will immediately be taken up in reaction with the alkali and no deterioration will take place thereby. The exothermic reaction takes place in the impeller 29 zone. If desired, a plurality of input lines 35 and 36 may be positioned radially around the housing portions 13b and 13a and extending into the inner draft tube portions 14b and 14a whereby to uniformly distribute the reactants in the circulating reaction product.

The stream of reacted material is discharged above the liquid level in the vessel 10 into a zone or region of pressure substantially reduced from that inside the draft tube 14. Upon being subjected to the reduced pressure, a controlled amount of the water carrying the reaction products is flash-evaporated, absorbing the heat required for vaporization from the mass and thus serving to control the temperature at any desired level.

The vessel 10 may be provided with suitable means to prevent entrainment of liquid in the vapor leaving the vessel, e.g., baffle plates or the like. The pressure in the inner draft tube is controlled by elevating and lowering the movable head 20.

From the foregoing it will be seen that the invention is one which is well adapted to attain all of the ends and objects hereinbefore set forth together with other advantages which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinbefore set forth or shown in the accompanying drawings is to be interpreted as illustrative and not in a limiting sense.

Having thus described my invention, I claim:

1. A method of conducting an exothermic chemical reaction involving at least two reactant materials, the reaction product including a flashable component comprising the steps of maintaining a liquid body of reaction product in a vessel, continuously withdrawing a stream of product from said body, introducing into said stream a first one of said reagents so as to create an excess thereof therein, mechanically mixing said first reagent-rich stream to thoroughly disperse the first reagent in said stream, introducing into said mechanically mixed first reagent-rich stream the second of said reagents, mechanically mixing said second reagent-containing stream to thoroughly disperse it therein, maintaining sufficient pressure on said stream to prevent vaporization of a volatile ingredient thereof while outside said vessel, and continuously introducing said stream into said vessel with simultaneous reduction in pressure to flash said volatile ingredient into vapor.

2. A method as in claim 1 wherein the presence of one of said reagents in excess in the stream is not desired and the other reagent is introduced first whereby there is never an excess of the former reagent.

3. A method of neutralizing an organic sulfonic acid which comprises maintaining an aqueous body of neutralized material in a vesel under subatmospheric pressure, continuously withdrawing a stream of said material from said body, continuously introducing into said stream an aqueous alkali so as to create an excess thereof therein, mechanically mixing said alkali-rich stream to thoroughly disperse the alkali in said stream, introducing into said mechanically mixed alkali-rich stream the acid, mechanically mixing said acid-containing stream to thoroughly disperse the acid in the alkali and product, maintaining sufficient pressure on said stream to prevent vaporization of a volatile ingredient thereof while outside said vessel, and continuously introducing said stream into said vessel with simultaneously reducing the pressure to flash said volatile ingredient into vapor.

4. In a method of conducting an exothermic chemical reaction involving at least two reactant materials, the reaction product including a flashable component, wherein a stream of liquid reaction product is recycled from and back to a liquid body of reaction material to permit mixing of the reactant materials therein, the return stream to the vessel being continuously introduced into said vessel with simultaneous reduction in pressure to flash the volatile ingredient into vapor, the improvement which comprises introducing into the stream of product withdrawn from the liquid body of reaction product a first one of said reagents so as to create an excess thereof therein, mechanically mixing said first reagent-rich stream to thoroughly disperse the first reagent in said stream, introducing into said mechanically mixed, first reagent-rich stream the second of said reagents, and mechanically mixing said second reagent-containing stream to thoroughly disperse it therein while maintaining sufficient pressure on said stream to prevent vaporization of the volatile ingredient thereof while outside of said vessel.

5. In a method of neutralizing an organic sulfonic acid wherein an aqueous body of neutralized material is maintained in a vesel under subatmospheric pressure and a stream of said neutralized material is continuously withdrawn from said body and recycled back to said vessel, sufficient pressure being maintained on said stream outside of said vessel to prevent vaporization of a volatile ingredient thereof while outside the vessel, the stream being continuously reintroduced to said vessel simultaneously reducing the pressure therein to flash the volatile ingredient into vapor, the improvement which comprises continuously introducing into said stream outside said vessel an aqueous alkali so as to create an excess thereof therein, mechanically mixing said alkali-rich stream to thoroughly disperse the alkali in said stream, introducing into said mechanically mixed, alkali-rich stream the acid, and mechanically mixing said acid containing stream to thoroughly disperse the acid in the alkali and product.

References Cited in the file of this patent

UNITED STATES PATENTS

| | | |
|---|---|---|
| 1,543,157 | Herzog | June 23, 1925 |
| 2,536,603 | Homboe | Jan. 2, 1951 |
| 2,577,856 | Nelson | Dec. 11, 1951 |
| 2,635,103 | Molteni et al. | Apr. 14, 1953 |
| 2,655,435 | Ledgett | Oct. 13, 1953 |
| 2,690,446 | Ledgett | Sept. 18, 1954 |
| 2,720,447 | Jones et al. | Oct. 11, 1955 |